(12) United States Patent
Nose et al.

(10) Patent No.: US 7,849,191 B2
(45) Date of Patent: Dec. 7, 2010

(54) DOWNLOAD SYSTEM, COMMUNICATION TERMINAL, SERVER, AND DOWNLOAD METHOD

(75) Inventors: Yasuhiro Nose, Kanagawa (JP); Koichi Moriyama, Tokyo (JP); Seiji Hoshi, Kanagawa (JP); Akihiro Ichinose, Kanagawa (JP); Masato Takeichi, Kanagawa (JP); Kazunori Nasu, Kanagawa (JP); Atsushi Hosokawa, Nara (JP); Yuka Kubokawa, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 1341 days.

(21) Appl. No.: 10/536,876

(22) PCT Filed: Nov. 28, 2003

(86) PCT No.: PCT/JP03/15285
§ 371 (c)(1),
(2), (4) Date: Feb. 6, 2006

(87) PCT Pub. No.: WO2004/051488
PCT Pub. Date: Jun. 17, 2004

(65) Prior Publication Data
US 2006/0173975 A1    Aug. 3, 2006

(30) Foreign Application Priority Data
Nov. 29, 2002    (JP) .............................. 2002-348579

(51) Int. Cl.
*G06F 15/173* (2006.01)
(52) U.S. Cl. .................. 709/226; 725/93; 725/152; 717/168; 717/174

(58) Field of Classification Search ............... 709/224, 709/223, 219, 231; 725/93, 152; 455/154.1; 707/100
See application file for complete search history.

(56) References Cited

U.S. PATENT DOCUMENTS

| | | | |
|---|---|---|---|
| 6,278,712 B1 * | 8/2001 | Takihiro et al. | 370/400 |
| 6,510,556 B1 * | 1/2003 | Kusaba et al. | 725/93 |
| 6,856,962 B2 * | 2/2005 | Yonemitsu | 705/8 |
| 7,017,179 B1 * | 3/2006 | Asamoto et al. | 725/152 |
| 7,191,244 B2 * | 3/2007 | Jennings et al. | 709/231 |

(Continued)

FOREIGN PATENT DOCUMENTS

EP    0 942 601    5/1999

(Continued)

*Primary Examiner*—Dustin Nguyen
(74) *Attorney, Agent, or Firm*—Oblon, Spivak, McClelland, Maier & Neustadt, L.L.P.

(57) ABSTRACT

A download system capable of appropriately spreading loads on a server and on a transmission path, and further enhancing convenience in download of data. A reservation candidate acquirer of a communication terminal acquires from a software managing server reservation candidate information containing time information about time zones as candidates to which a reservation for download of an update file can be allocated. At the communication terminal a user selects a reserved time zone from the time zones corresponding to the time information included in the reservation candidate information, and the software managing server registers the reservation in the reserved time zone. Thereby, the reserved time zone can be selected from the candidate time zones transmitted by the software managing server and the candidate time zones are determined based on a reservation table set so as to spread loads on the software managing server and on the transmission path.

23 Claims, 11 Drawing Sheets

U.S. PATENT DOCUMENTS

| | | | |
|---|---|---|---|
| 7,386,623 B2 * | 6/2008 | Nishimura et al. | 709/231 |
| 7,447,486 B2 * | 11/2008 | Tamura et al. | 455/154.1 |
| 2002/0016162 A1 | 2/2002 | Yoshihara et al. | |
| 2002/0026512 A1 | 2/2002 | Nishimura et al. | |
| 2003/0033384 A1 * | 2/2003 | Nishizawa et al. | 709/219 |
| 2004/0068506 A1 * | 4/2004 | Kobayashi et al. | 707/100 |
| 2004/0193726 A1 * | 9/2004 | Gatto et al. | 709/238 |

FOREIGN PATENT DOCUMENTS

| | | |
|---|---|---|
| EP | 1 158 432 A1 | 11/2001 |
| JP | 8-172437 | 7/1996 |
| JP | 11-355346 | 12/1999 |
| JP | 2001-092910 | 4/2001 |
| JP | 2001-92910 | 4/2001 |
| JP | 2001-337882 | 12/2001 |
| JP | 2002-149928 | 5/2002 |
| WO | WO 01/73569 A1 | 10/2001 |

* cited by examiner

Fig.7

| TERMINAL ID | VERSION INFORMATION | UPDATE SOFTWARE | FILE CAPACITY |
|---|---|---|---|
| 0001 | 1 | A | 200 |
|  | 2 | B | 150 |
| 0002 | 1 | C | 120 |
|  | 2 | D | 180 |
| ------------ | ------------ | ------------ | ------------ |

Fig. 9

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|---|
| 2002/7/1 | 1 | 1 | 1 | 1 | 1 | 1 | 1 | 1 | 1 | 1 | 1 | 0 | 0 | 0 | 0 | 0 | 0 | 0 | 0 | 0 | 0 | 0 | 0 | 0 | 1 |
| ......... | | | | | | | | | | | | | | | | | | | | | | | | | |
| 2002/7/22 | 1 | 1 | 1 | 1 | 1 | 1 | 1 | 1 | 1 | 1 | 1 | 0 | 0 | 0 | 0 | 0 | 0 | 0 | 0 | 0 | 0 | 0 | 0 | 0 | 1 |
| 2002/7/23 | 1 | 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 | 1 |
| 2002/7/24 | 0 | 1 | 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 |
| ......... | | | | | | | | | | | | | | | | | | | | | | | | | |
| 2002/7/31 | 1 | 1 | 1 | 1 | 1 | 1 | 1 | 1 | 1 | 1 | 1 | 0 | 0 | 0 | 0 | 0 | 0 | 0 | 0 | 0 | 0 | 0 | 0 | 0 | 1 |

DOWNLOAD SYSTEM, COMMUNICATION TERMINAL, SERVER, AND DOWNLOAD METHOD

TECHNICAL FIELD

The present invention relates to a download system, a communication terminal, a server, and a download method.

BACKGROUND ART

When a communication terminal downloads data stored in a server, it is necessary to appropriately control loads on the server and on a transmission path. One of the known techniques to address this issue is a technique in which the communication terminal transmits to the server a desired time for download of data from the server and in which the server determines a delivery time of data so as to spread the loads on the server and on the transmission path (e.g., reference is made to Japanese Patent Application Laid-Open No. 11-355346).

DISCLOSURE OF THE INVENTION

In the conventional technique described above, however, the user is allowed to transmit the desired time for download, but if there are heavy loads on the server and/or on the transmission path at the desired time, the server will automatically allocate the data delivery time to another time, which posed the problem that user's convenience degraded.

The present invention has been accomplished in order to solve the above problem and an object of the invention is to provide a download system, a communication terminal, a server, and a download method capable of appropriately spreading the loads on the server and on the transmission path and further enhancing the convenience in download of data.

In order to achieve the above object, a download system according to the present invention is a download system comprising a server to manage data, and a communication terminal to download the data from the server, wherein the communication terminal comprises: reservation candidate acquiring means for transmitting to the server a transmission request for transmission of reservation candidate information containing time information indicating at least a start time concerning each candidate time zone to which a reservation for download of the data can be allocated, and for acquiring the reservation candidate information transmitted in response to the request by the server; reservation selecting means for transmitting to the server reservation choice information containing as reservation time information the time information selected based on the reservation candidate information acquired by the reservation candidate acquiring means, and for storing the start time indicated by the reservation time information, as an initiation time of the download; data request transmitting means for transmitting a transmission request for transmission of the data to the server, at the initiation time stored by the reservation selecting means; and data receiving means for receiving the data transmitted by the server in accordance with the transmission request for transmission of the data transmitted by the data request transmitting means; wherein the server comprises: data storing means for storing the data; reservation information storing means for storing a reservation table in which the reservation for the download is to be allocated to reservation frames within a maximum number at each time to permit simultaneous execution of the download, set based on a load state at each time preliminarily measured; reservation candidate generating means for, in response to the transmission request for the transmission of the reservation candidate information transmitted by the communication terminal, determining time zones as candidates available for the download of the data, based on the reservation table stored in the reservation information storing means, for generating the reservation candidate information containing the time information about the time zones, and for transmitting the reservation candidate information to the communication terminal; reservation registering means for receiving the reservation choice information transmitted by the communication terminal, and for registering in the reservation table the reservation for the download in the time zone corresponding to the reservation time information included in the reservation choice information; and data transmitting means for transmitting to the communication terminal the data stored in the data storing means, in response to the transmission request for transmission of the data transmitted by the communication terminal.

In order to achieve the above object, a communication terminal according to the present invention is a communication terminal adapted for downloading data from a server to manage the data, comprising: reservation candidate acquiring means for transmitting to the server a transmission request for transmission of reservation candidate information containing time information indicating at least a start time concerning each candidate time zone to which a reservation for download of the data can be allocated, and for acquiring the reservation candidate information transmitted in response to the request by the server; reservation selecting means for transmitting to the server reservation choice information containing as reservation time information the time information selected based on the reservation candidate information acquired by the reservation candidate acquiring means, and for storing the start time indicated by the reservation time information, as an initiation time of the download, data request transmitting means for transmitting a transmission request for transmission of the data to the server, at the initiation time stored by the reservation selecting means; and data receiving means for receiving the data transmitted by the server in accordance with the transmission request for transmission of the data transmitted by the data request transmitting means.

In order to achieve the above object, a server according to the present invention is a server adapted for managing data to be downloaded by a communication terminal, comprising: data storing means for storing the data; reservation information storing means for storing a reservation table in which the reservation for the download is to be allocated to reservation frames within a maximum number at each time to permit simultaneous execution of the download, set based on a load state at each time preliminarily measured; reservation candidate generating means for, in response to the transmission request for the transmission of the reservation candidate information transmitted by the communication teal, determining time zones as candidates available for the download of the data, based on the reservation table stored in the reservation information storing means, for generating the reservation candidate information containing time information about the time zone indicating at least a start time thereof, and for transmitting the reservation candidate information to the communication terminal; reservation registering means for receiving the reservation choice information containing as reservation time information the time information selected based on the reservation candidate information transmitted by the communication terminal, and for registering in the reservation table the reservation for the download in the time zone indicated by the reservation time information included in the reservation choice information; and data transmitting means for transmitting to the communication terminal the data stored in the data storing means, in response to the transmission request for transmission of the data transmitted at the start time of the reservation time information by the communication terminal.

In order to achieve the above object, a download method according to the present invention is a download method in which a communication terminal downloads data from a server to manage the data, the download method comprising: a reservation candidate request transmitting step wherein reservation candidate acquiring means of the communication terminal transmits to the server a transmission request for transmission of reservation candidate information containing time information indicating at least a start time concerning each candidate time zone to which a reservation for download of the data can be allocated; a reservation candidate generating step wherein, in response to the transmission request for transmission of the reservation candidate information transmitted by the communication terminal, reservation candidate generating means of the server determines time zones as candidates available for the download of the data, based on a reservation table in which the reservation for the download is to be allocated to reservation frames within a maximum number at each time to permit simultaneous execution of the download, set based on a load state at each time preliminarily measured, and which is stored in reservation information storing means, generates the reservation candidate information containing the time information about the time zones, and transmits the reservation candidate information to the communication terminal; a reservation candidate acquiring step wherein the reservation candidate acquiring means of the communication terminal acquires the reservation candidate information transmitted by the server; a reservation selecting step wherein reservation selecting means of the communication terminal transmits to the server reservation choice information containing as reservation time information the time information selected based on the reservation candidate information acquired by the reservation candidate acquiring means, and stores the start time indicated by the reservation time information, as an initiation time of the download; a reservation registering step wherein reservation registering means of the server receives the reservation choice information transmitted by the communication terminal, and registers in the reservation table the reservation for the download in the time zone corresponding to the reservation time information included in the reservation choice information; a data request transmitting step wherein data request transmitting means of the communication terminal transmits a transmission request for transmission of the data to the server, at the initiation time stored by the reservation selecting means; a data transmitting step wherein data transmitting means of the server transmits to the communication terminal the data stored in the data storing means, in response to the transmission request for transmission of the data transmitted by the communication terminal; and a data receiving step wherein data receiving means of the communication terminal receives the data transmitted by the server in accordance with the transmission request for transmission of the data.

According to these aspects of the invention, when the communication terminal reserves a time for download of data from the server, the server transmits the reservation candidate information containing the time information about the time zones of candidates to which the reservation for the download can be allocated. The server generates the foregoing reservation candidate information, based on the reservation table in which the reservation for download is to be allocated to the reservation frames within the maximum to permit simultaneous execution of the download at each time, so as to spread the loads on the basis of track records of the loads on the server and on the transmission path. Namely, the server puts in the reservation candidate information the time information about time zones containing remaining reservation frames to which a time necessary for the download of the data can be allocated. The communication terminal transmits to the server the reservation choice information containing the time information selected by the user from this reservation candidate information, as the reservation time information, and stores the start time indicated by the reservation time information, as an initiation time of the download. The server registers the reservation for the time zone corresponding to the reservation time information included in the reservation choice information, as a time zone of the download. The communication terminal transmits a transmission request for transmission of the data to the server at the foregoing initiation time stored, and receives the data transmitted by the server. As described above, the server determines the time zones containing available reservation frames to which no reservation is allocated yet, from the reservation table in which reservation frames are provided so as to spread the load on the server, the load on the transmission path, and so on, and the server notifies the communication terminal of the information about the candidate time zones for the download. Therefore, the user of the communication terminal can select a preferred time zone out of the candidate time zones for the download, which enhances the convenience for the user of the communication terminal. Since the allocation of the reservation for the download carried out in this manner is executed based on the reservation table set so as to spread the loads on the server and on the transmission path, it is feasible to appropriately spread the loads on the server and on the transmission path.

In the download system of the present invention, preferably, in generating the reservation candidate information, the reservation candidate selecting means of the server temporarily allocates in the reservation table, reservations for the download corresponding to the time information included in the reservation candidate information, together with information to identify the communication terminal having transmitted the transmission request for transmission of the reservation candidate information, and wherein the reservation registering means adopts the reservation in the time zone corresponding to the reservation time information included in the reservation choice information, transmitted by the communication terminal, among the reservations temporarily allocated together with the information to identify the communication terminal, in the reservation table, and cancels the other reservations temporarily allocated together with the information to identify the communication terminal, in the reservation table.

In the server of the present invention, preferably, in generating the reservation candidate information, the reservation candidate selecting means temporarily allocates in the reservation table, reservations for the download corresponding to the time information included in the reservation candidate information, together with information to identify the communication terminal having transmitted the transmission request for transmission of the reservation candidate information, and wherein the reservation registering means adopts the reservation in the time zone corresponding to the reservation time information included in the reservation choice information transmitted by the communication terminal, among the reservations temporarily allocated together with the information to identify the communication terminal, in the reservation table, and cancels the other reservations temporarily allocated together with the information to identify the communication terminal, in the reservation table.

In the download method of the present invention, preferably, in the reservation candidate generating step, the reservation candidate selecting means of the server, in generating the reservation candidate information, temporarily allocates in the reservation table, reservations for the download corresponding to the time information included in the reservation candidate information, together with information to identify the communication terminal having transmitted the transmission request for transmission of the reservation candidate information, and wherein in the reservation registering step, the reservation registering means of the server adopts the reservation in the time zone corresponding to the reservation time information included in the reservation choice information transmitted by the communication terminal, among the reservations temporarily allocated together with the information to identify the communication terminal, in the reservation table, and cancels the other reservations temporarily allocated together with the information to identify the communication terminal, in the reservation table.

According to these aspects of the invention, when the server generates the foregoing reservation candidate information, the server temporarily allocates in the reservation table the reservations in the time zones corresponding to the time information included in the reservation candidate information, together with the information to identify the communication terminal. Then the server actually registers the reservation in the time zone corresponding to the reservation time information included in the reservation choice information transmitted from the communication terminal, and cancels the other reservations temporarily allocated for the communication terminal. Therefore, where the communication terminal selects the reservation time information out of the time information included in the reservation candidate information, the server will not allocate a reservation to the time zone corresponding to the reservation time information, for another communication terminal, whereby the convenience is further enhanced about the reservation for download of data.

In the download system of the present invention, preferably, in generating the reservation candidate information, the reservation candidate generating means of the server generates the reservation candidate information preferentially contain the time information about time zones with a large number of reservation frames to which the reservation for the download is not allocated, based on the reservation table.

In the server of the present invention, preferably, in generating the reservation candidate information, the reservation candidate generating means generates the reservation candidate information preferentially contain the time information about time zones with a large number of reservation frames to which the reservation for the download is not allocated, based on the reservation table.

In the download method of the present invention, preferably, in the reservation candidate generating step, the reservation candidate generating means of the server, in generating the reservation candidate information, generates the reservation candidate information preferentially contain the time information about time zones with a large number of reservation frames to which the reservation for the download is not allocated, based on the reservation table.

According to these aspects of the invention, when the server generates the foregoing reservation candidate information, the server makes the reservation candidate information preferentially contain the time information about the time zones with more remaining reservation frames, which further spreads the loads on the server and on the mission path.

The download system of the present invention may be configured as follows: the communication terminal further comprises available range acquiring means for transmitting to the server a transmission request for transmission of available range information containing information about presence/absence of a time zone available for the reservation for the download in each of second predetermined periods obtained by subdividing a first predetermined period, and for receiving the available range information transmitted from the server; the server further comprises available range generating means for generating the available range information in accordance with the transmission request for transmission of the available range information transmitted by the communication terminal, and for transmitting the available range information to the communication terminal; the reservation candidate acquiring means transmits to the server the transmission request for transmission of the reservation candidate information containing the information about the second predetermined period selected based on the available range information received by the available range acquiring means; the reservation candidate generating means generates the reservation candidate information containing the time information about time zones available for the reservation for the download in the second predetermined period, based on the information about the second predetermined period included in the transmission request for transmission of the reservation candidate information transmitted by the communication terminal, and transmits the reservation candidate information to the communication terminal.

The communication terminal of the present invention may be configured as follows: the communication terminal further comprises available range acquiring means for transmitting to the server a transmission request for transmission of available range information containing information about presence/absence of a time zone available for the reservation for the download in each of second predetermined periods obtained by subdividing a first predetermined period, and for receiving the available range information transmitted from the server; the reservation candidate acquiring means transmits to the server the transmission request for transmission of the reservation candidate information containing the information about the second predetermined period selected based on the available range information received by the available range acquiring means.

The server of the present invention may be configured as follows: the server further comprises available range generating means for receiving a transmission request for transmission of available range information transmitted by the communication terminal, for, in response to the transmission request for transmission of the available range information, generating the available range information containing information about presence/absence of a time zone available for the reservation for the download in each of second predetermined periods obtained by subdividing a first predetermined period, and for transmitting the available range information to the communication terminal; the reservation candidate generating means receives the reservation candidate information containing information about the second predetermined period selected based on the available range information, transmitted, by the communication terminal, generates the reservation candidate information containing the time information about time zones available for the reservation for the download in the second predetermined period, based on the information about the second predetermined period included in the transmission request for transmission of the reservation candidate information, and transmits the reservation candidate information to the communication terminal.

The download method of the present invention may be configured as follows: the download method further comprises an available range request transmitting step wherein available range acquiring means of the communication terminal transmits to the server a transmission request for transmission of available range information containing information about presence/absence of a time zone available for the reservation for the download in each of second predetermined periods obtained by subdividing a first predetermined period; an available range generating step wherein available range generating means of the server generates the available range information in accordance with the transmission request for transmission of the available range information transmitted by the communication terminal, and transmits the available range information to the communication terminal; and an available range acquiring step wherein the available range acquiring means of the communication terminal receives the available range information transmitted from the server; in the reservation candidate request transmitting step, the reservation candidate acquiring means of the communication terminal transmits to the server the transmission request for transmission of the reservation candidate information containing the information about the second predetermined period selected based on the available range information received by the available range acquiring means; the reservation candidate generating means of the server generates the reservation candidate information containing the time information about time zones available for the reservation for the download in the second predetermined period, based on the information about, the second predetermined period included in the transmission request for transmission of the reservation candidate information transmitted by the communication terminal, and transmits the reservation candidate information to the communication terminal.

According to these aspects of the invention, the server generates the available range information containing the information about the presence/absence of a time zone available for the reservation for the download in each of the second predetermined periods obtained by subdividing the first predetermined period, and transmits it to the communication terminal. Here the first predetermined period can be, for example, one month, and each of the second predetermined periods is one hour resulting from subdivision of one month. Namely, the server transmits to the communication terminal the information about whether a time zone available for the reservation for the download is included in each of hours. In the communication terminal, the user refers to this available range information and selects a second predetermined period desired for the reservation for the download, and then the communication terminal transmits to the server the transmission request for transmission of the reservation candidate information containing the information about the selected second predetermined period. Namely, the communication terminal transmits to the server the transmission request for transmission of the reservation candidate information, in which the condition for the period to make the reservation for the download is designated by the communication terminal. The server generates the reservation candidate information containing the time information about time zones available for the reservation for the download in the second predetermined period, based on the information about the second predetermined period included in the transmission request for transmission of the reservation candidate information, and transmits the reservation candidate information to the communication terminal. As the server preliminarily transmits the information about the second predetermined periods available for the reservation for the download in the first predetermined period in this manner, the communication terminal is able to transmit to the server the transmission request for transmission of the reservation candidate information with the condition to specify the second predetermined period desired to allocate the reservation for the download, by the user. The server is able to extract only time zones of candidates available for the reservation for the download in the period desired by the user of the communication terminal, and to notify the communication terminal of the information about the time zones. Therefore, the convenience is further enhanced about the reservation for download.

The download system of the present invention may be configured as follows: the available range information generated by the available range generating means contains level information indicating a number of reservation frames to which the reservation for the download is not allocated, in each of the second predetermined periods.

The server of the present invention may be configured as follows: the available range information generated by the available range generating means contains level information indicating a number of reservation frames to which the reservation for the download is not allocated, in each of the second predetermined periods.

The download method of the present invention may be configured as follows: in the available range generating step, the available range information generated by the available range generating means of the server contains level information indicating a number of the reservation frame to which the reservation for the download is not allocated in each of the second predetermined periods.

According to these aspects of the invention, the foregoing available range information contains the level information indicating the remaining number of reservation frames to which the reservation for download can be allocated, in each of the second predetermined periods. This permits the user of the communication terminal to acknowledge whether a vacant space of reservation frames is large, in each of the second predetermined periods.

In the download system of the present invention, preferably, the available range information generated by the available range generating means is comprised of a list indicating binary values of the information about the presence/absence of a time zone available for the reservation for the download in each of the second predetermined periods.

In the server of the present invention, preferably, the available range information generated by the available range generating means is comprised of a list indicating binary values of the information about the presence/absence of a time zone available for the reservation for the download in each of the second predetermined periods.

In the download method of the present invention, preferably, in the available range generating step, the available range information generated by the available range generating means of the server is comprised of a list indicating binary values of the information about the presence/absence of a time zone available for the reservation for the download in each of the second predetermined periods.

According to these aspects of the invention, the foregoing available range information is comprised of the list indicating binary values of the information about the presence/absence of a time zone available for the reservation for the download in each of the second predetermined periods. For example, where there is a time zone to which the reservation for the download can be allocated, the information about the presence/absence of the time zone available for the reservation for the download in the second predetermined period to which the time zone belongs is indicated by a bit of on; where there is no time zone in reverse, the information is indicated by a bit of off. Therefore, the data volume can be reduced more than in generation of the available range information as text information, which can reduce the load on the transmission path.

In the download system of the present invention, preferably, the available range information generated by the available range generating means is comprised of a list resulting from further text conversion of a list indicating binary values of the information about the presence/absence of a time zone available for the reservation for the download in each of the second predetermined periods.

In the server of the present invention, preferably, the available range information generated by the available range generating means is comprised of a list resulting from further text conversion of a list indicating binary values of the information about the presence/absence of a time zone available for the reservation for the download in each of the second predetermined periods.

In the download method of the present invention, preferably, in the available range generating step, the available range information generated by the available range generating means of the server is comprised of a list resulting from further text conversion of a list indicating binary values of the information about the presence/absence of a time zone available for the reservation for the download in each of the second predetermined periods.

According to these aspects of the invention, the server generates the list resulting from further text conversion of the aforementioned list of the binary values, and transmits it to the communication terminal, whereby it becomes feasible to transmit the list even in a network adopting a protocol incapable of transmitting binary data.

BRIEF DESCRIPTION OF THE DRAWINGS

FIG. 7 is an illusion showing a storage format of update files in an update software storage of a software managing server according to the embodiment.

FIG. 9 is an illustration showing a data format of available range information generated by an available range generator of the software managing server according to the embodiment.

BEST MODES FOR CARRYING OUT THE INVENTION

Figure 1:
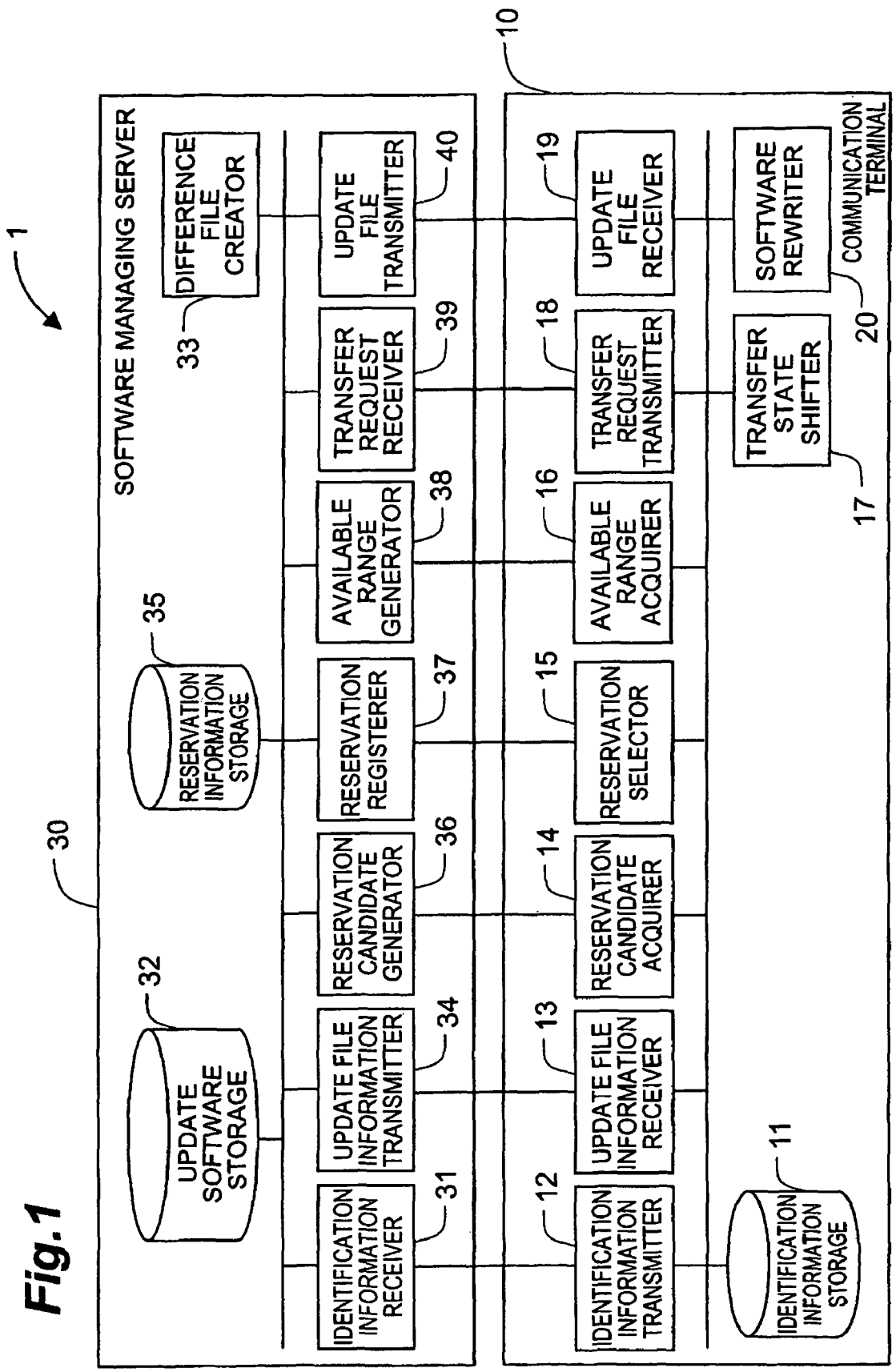
FIG. 1 is a block diagram showing a functional configuration of a software update system according to an embodiment.

A download system according to an embodiment of the present invention will be described below. The download system according to the present embodiment is constructed as a software update system 1 in which a communication terminal 10 downloads software from a software managing server 30 to manage the software as data FIG. 1 is a block diagram showing a configuration of the software update system 1. As shown in FIG. 1, the software update system 1 comprises the communication terminal 10 and the software managing server 30. The communication terminal 10 and the software managing server 30 will be described below in detail.

The communication terminal 10 is physically comprised of a rewritable nonvolatile memory such as a flash ROM, a rewritable volatile memory such as a RAM (Random Access Memory), a communication device, a CPU (central processing unit), and so on. The communication terminal 10 according to the present embodiment can be one selected from a wide variety of communication terminals that necessitates update of software an update file of which is downloaded by means of the communication device and which is directly executed as stored on the rewritable nonvolatile memory, e.g., mobile communication terminals such as cell phones, portable terminals such as PDAs (Personal Digital Assistants), digital consumer electronics, and so on.

The rewritable nonvolatile memory stores the basic software or the like for controlling the communication terminal 10, such as an OS, middleware, communication software, and so on. This basic software is directly executed on the rewritable nonvolatile memory. The rewritable volatile memory is used in usage for storing data and software not affecting the operation of the communication terminal 10 even if the stored information is erased upon power-off or the like.

Next, functional components of the communication terminal 10 will be described. As shown in FIG. 1, the communication terminal 10 is composed of such functional components as identification information storage 11, identification information transmitter 12, update file information receiver 13, reservation candidate acquirer (reservation candidate acquiring means) 14, reservation selector (reservation selecting means) 15, available range acquirer (available range acquiring means) 16, transfer state shifter 17, transfer request transmitter (data request transmitter) 18, update file receiver (data receiver) 19, and software rewriter 20. The functions of these components are implemented, for example, in such a manner that software and/or data for controlling the update of software is stored on the rewritable nonvolatile memory and the CPU controls the communication device and others in accordance with the software.

The identification information storage 11 stores identification information such as a terminal ID of the communication terminal 10 and version information of software directly executed as stored on the rewritable nonvolatile memory. Specifically, it is realized by storing the identification information on the rewritable nonvolatile memory of the communication terminal 10.

The identification information transmitter 12 acquires from the identification information storage 11 the identification information such as the terminal ID of the communication terminal 10 stored in the identification information storage 11 and the version information of software directly executed as stored on the rewritable nonvolatile memory, and transmits the identification information to the software managing server 30.

The update file information receiver 13 receives through the communication device from the software managing server 30, update file information containing information such as the presence/absence of an update file to be downloaded from the software managing server 30, and size information of the update file.

Figure 2:
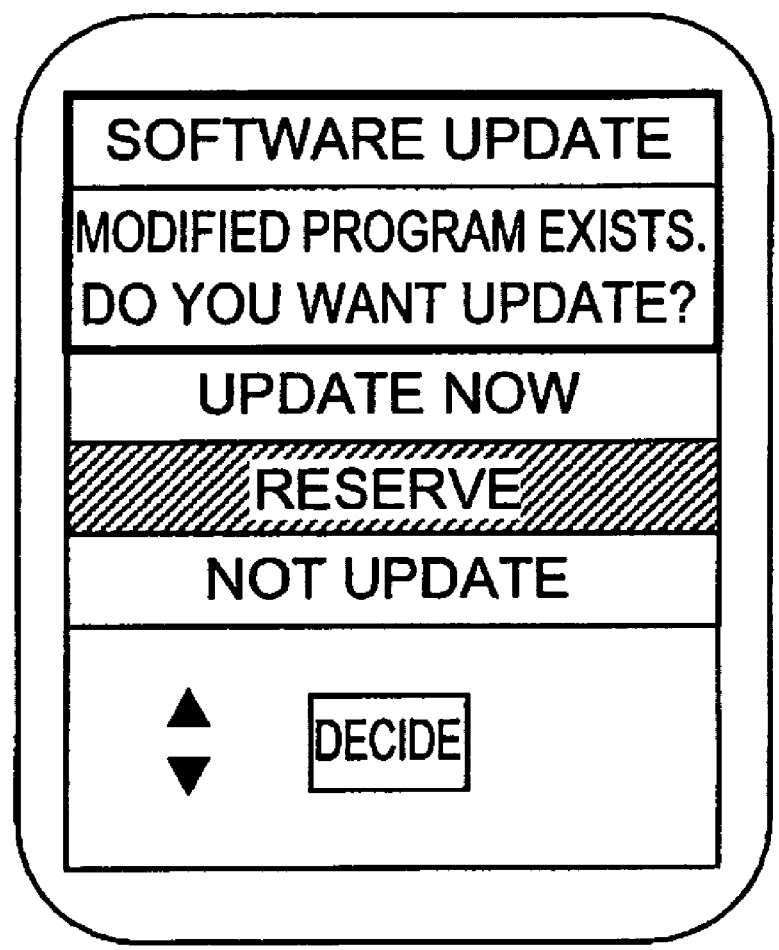
FIG. 2 is an illustration showing an example of a screen to encourage a user to select an update method of software displayed in a communication terminal according to the embodiment.

The reservation candidate acquirer 14 refers to the update file information received by the update file information receiver 13, and, when determining that there is an update file, it displays a screen to encourage the user to select an updated method of software. FIG. 2 is an illustration showing an example of the screen. As shown in FIG. 2, the reservation candidate acquirer 14 displays an "Update now" icon indicating that the update file is to be immediately downloaded from the software managing server 30 to effect an update of software, a "Reserve" icon indicating that a reservation is to be made for a time zone for download of the update file, in order to effect an update of software, and a "Not update" icon indicating that the update of software is not desired.

When the user selects the "Update now" icon and pushes a "Decision" icon, the reservation candidate acquirer 14 outputs the information that the update of software is to be executed now, to the transfer state shifter 17. When the user selects the "Not update" icon and pushes the "Decision" icon, the reservation candidate acquirer 14 terminates the process concerning the update of software. When the user selects the "Reserve" icon and pushes the "Decision" icon, the reservation candidate acquirer 14 transmits to the software managing server 30 a transmission request for transmission of reservation candidate information containing time information about time zones of candidates available for a reservation for the download of the update file. FIG. 2 shows a state in which the "Reserve" icon is selected.

The reservation selector 15 receives the reservation candidate information transmitted by the software managing server 30 in accordance with the transmission request for transmission of the reservation candidate information transmitted by the reservation candidate acquirer 14. This reservation candidate information contains the aforementioned time information. This time information indicates a start time and an end time concerning each candidate time zone available for the reservation for the download of the update file. The time information may be information indicating only the start time. The present embodiment will be described hereinafter on the assumption that the foregoing time information contains the start time and end time concerning each candidate time zone available for the reservation for download of the update file.

Figure 3:
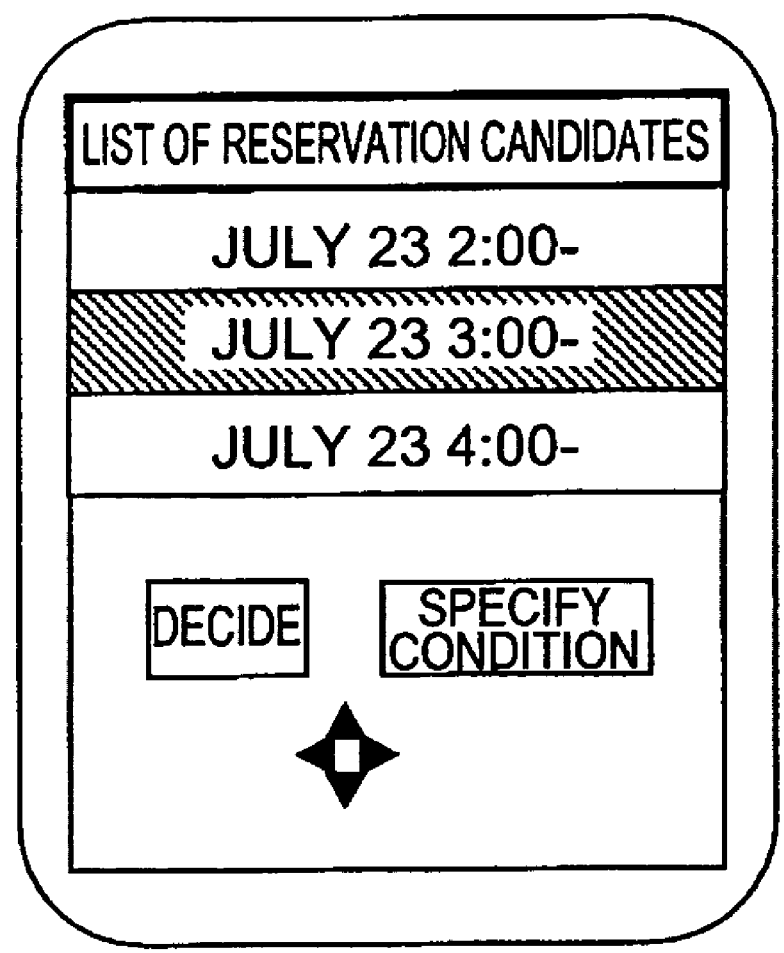
FIG. 3 is an illustration showing an example of a screen displaying candidates of time zones for download of an update file in the communication terminal according to the embodiment.

When the reservation selector 15 receives the foregoing reservation candidate information, it displays a screen to encourage the user to select time information about a time zone to execute the download of the update file, out of the aforementioned time information included in the reservation candidate information. FIG. 3 is an illustration showing an example of the screen associated with the display. In the example of the screen shown in FIG. 3, three time zones specified by the foregoing time information are displayed. When the user of the communication terminal 10 selects one of these time zones and pushes the decision icon, the reservation selector 15 transmits to the software managing server 30 reservation choice information containing the time information corresponding to the selected time zone as reservation time information. FIG. 3 shows a state in which the time zone of "July 23 3:00—" is selected. The reservation selector 15 stores the start time of the above time zone selected by the user. On the other hand, where the candidate time zones displayed include no time zone desired by the user, the user pushes a "Specify condition" icon, whereupon the reservation selector 15 outputs information indicating that the "Specify condition" is selected, to the available range acquirer 16.

The available range acquirer 16 receives the information indicating that the "Specify condition" is selected, outputted from the reservation selector 15, and then transmits a request for transmission of available range information to the software managing server 30. This available range information contains information indicating the presence/absence of a time zone available for the reservation for download of the aforementioned update file, for example, about each of hours obtained by subdividing a period of one month in units of one hour.

Figure 4:
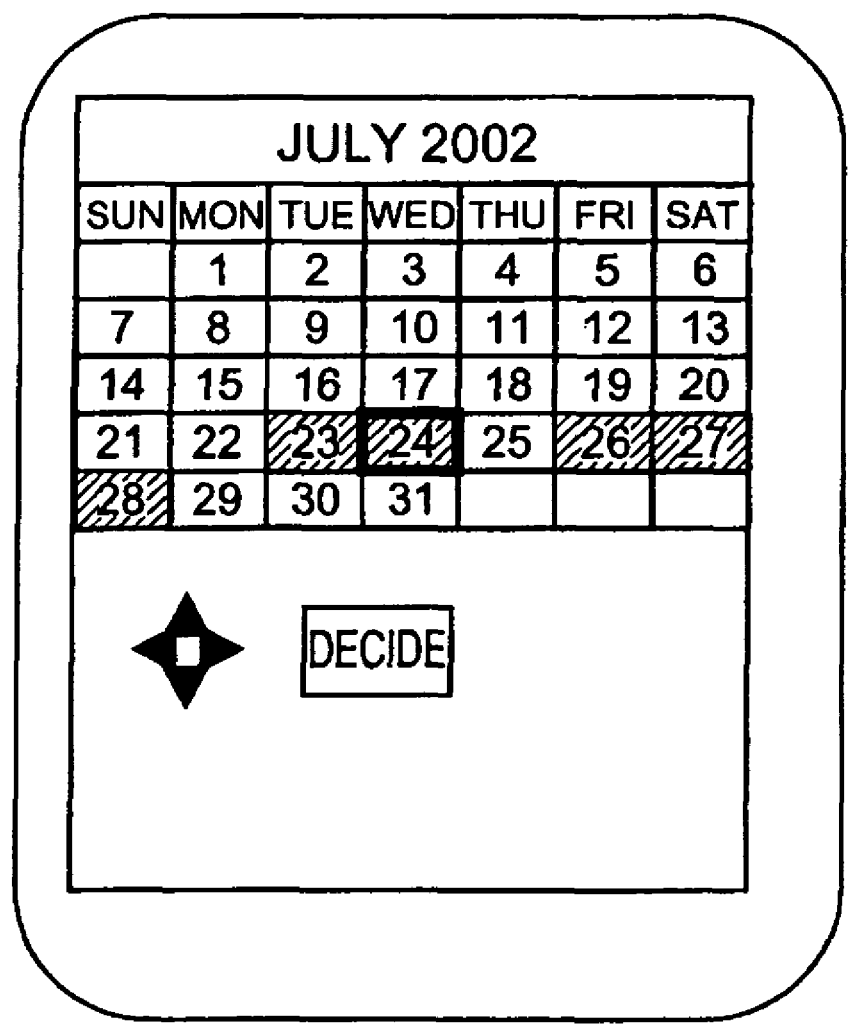
FIG. 4 is an illustration showing an example of a screen displayed based on available range information in the communication terminal according to the embodiment.

The available range acquirer 16 receives the available range information transmitted in response to the transmission request for transmission of the available range information by the software managing server 30, and first provides a display indicating the presence/absence of a time zone available for the reservation for the download of the aforementioned update file in each day, in day units in the aforementioned period of one month. FIG. 4 is an illustration showing a screen as an example of the display. The example of the screen shown in FIG. 4 presents the display indicating the presence/absence of the time zone available for the reservation for the download of the update file, for each of days in July 2002. Specifically, the screen example of FIG. 4 shows that the time zone available for the reservation for the download of the update file is present on the 23rd, the 24th, the 26th, the 27th, and the 28th and that the time zone available for the reservation for the download of the update file is absent on the other days.

Figure 5:
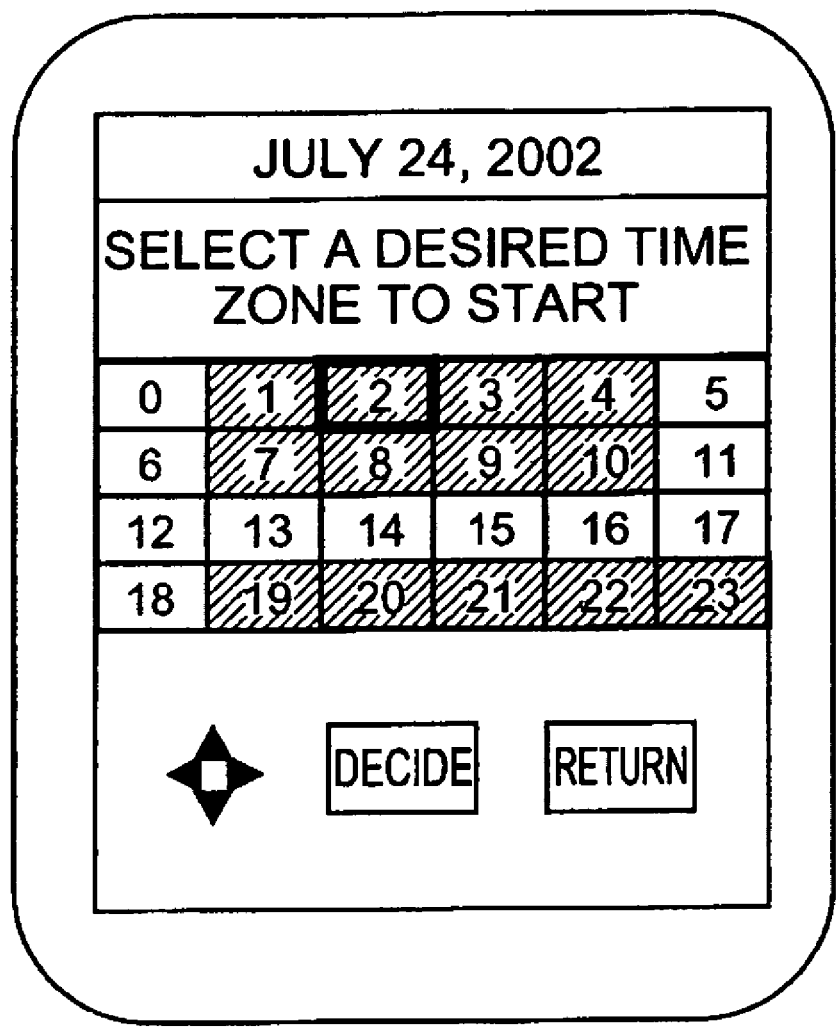
FIG. 5 is an illustration showing an example of a screen displayed based on available range information in the communication terminal according to the embodiment.

Supposing the user selects one of the days including the time zone available for the reservation for the download of the update file and pushes the decision icon, the available range acquirer 16 provides a display of a screen indicating the presence/absence of a time zone available for the reservation for the download of the update file, for each of time zones obtained by dividing the day in units of one hour. FIG. 5 is an illustration showing a screen as an example of the display. FIG. 5 shows the screen displayed when the user selects July 24 on the screen shown in FIG. 4. As shown in FIG. 5, the available range acquirer 16 provides the display of the screen in which the day selected by the user is divided in units of one hour. The available range acquirer 16 refers to the available range information to display hours to which start times of time zones available for the reservation for the download of the update file belong, in a color different from that for the other hours on the screen.

When the user viewing the screen shown in FIG. 5 selects one of the hours to which the start times of the time zones available for the reservation for the download of the update file belong, the available range acquirer 16 instructs the reservation candidate acquirer 14 to transmit to the software managing server 30 a transmission request for transmission of reservation candidate information containing time information about time zones available for the reservation, the start times of which are included in the selected hour. Namely, in response to this instruction, the reservation candidate acquirer 14 transmits to the software managing server 30 a request for transmission of the reservation candidate information with the condition to specify the hour.

Figure 6:
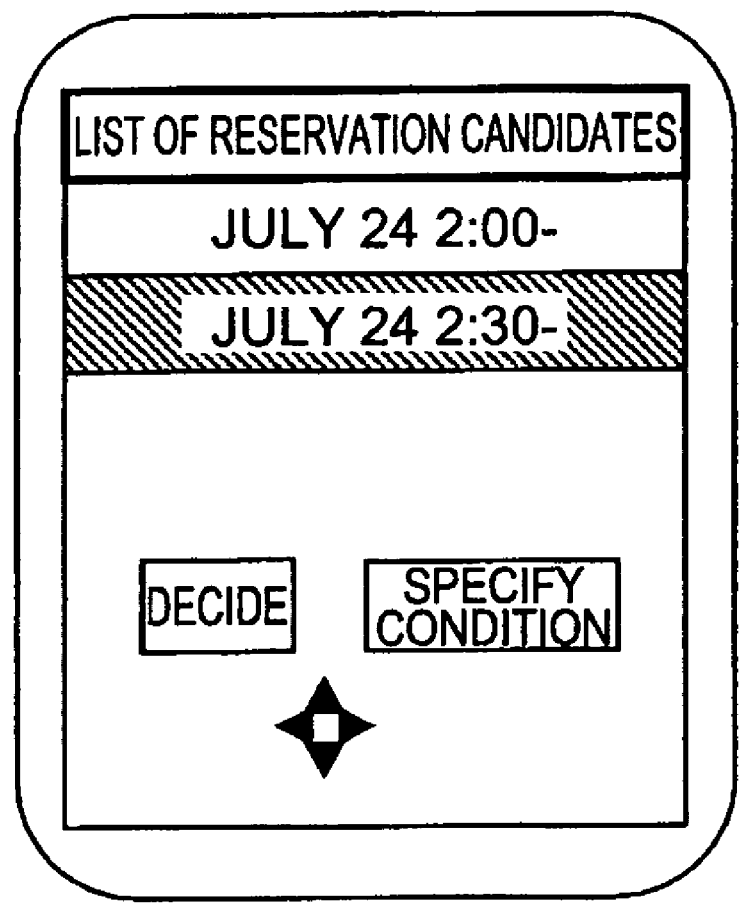
FIG. 6 is an illustration showing an example of a screen in which candidates of time zones for download of an update file are displayed in the communication terminal according to the embodiment.

In response to the transmission request for transmission of the reservation candidate information, the reservation candidate acquirer 14 acquires the reservation candidate information transmitted by the software managing server 30, and displays candidates of time zones available for the reservation for the download of the update file, specified by the time information included in the reservation candidate information. FIG. 6 is an illustration showing an example of the display. In the example of the screen shown in FIG. 6, two candidate time zones available for the reservation are displayed. When the user of the communication terminal 10 selects one of these candidate time zones and pushes the decision icon, the reservation selector 15 transmits to the software managing server 30 reservation choice information containing the reservation time information about the selected time zone. In conjunction therewith, the reservation selector 15 stores the start time of the time zone becoming a reserved time zone, as an initiation time of a process about the download of the update file. FIG. 6 shows the screen in a state in which the time zone of "July 24 2:30—" is selected.

When the user selects the "Update now" in accordance with the display to encourage the user to select one of the aforementioned software update methods, the transfer state shifter 17 limits operation of software to use the rewritable volatile memory, based on the update file information received by the update file information receiver 13, at the time of the selection. When the user selects "Reserve" in accordance with the display, the transfer state shifter 17 limits the operation of software to use the rewritable volatile memory, based on the update file information received by the update file information receiver 13, at the start time of the reserved time zone. This permits the transfer state shifter 17 to secure an area necessary for transfer and storage of the update file on the rewritable volatile memory and to effect transfer of the update file.

After the transfer state shifter 17 secures the area necessary for storage of the update file on the rewritable volatile memory, the transfer request transmitter 18 transmits through the communication device to the software managing server 30, a request for requesting the software managing server 30 to transfer the update file.

After the transfer request transmitter 18 transmits the request to the software managing server 30, the update file receiver 19 establishes connection through the communication device with the software managing server 30. Then the update file receiver 19 receives the update file from the software managing server 30 and stores it on the rewritable volatile memory.

After the update file receiver 19 receives the update file and stores it on the rewritable volatile memory, the software rewriter 20 rewrites the software directly executed as stored on the rewritable nonvolatile memory, into updated software stored as the update file on the rewritable volatile memory.

Returning to FIG. 1, the software managing server 30 will be described below. The software managing server 30 is a computer managing the update software to be stored on the rewritable nonvolatile memory of communication terminal 10. The software managing server 30 is physically comprised of a CPU, a storage device such as a memory, a recording medium such as a hard disk, a communication device, a display device such as a display, an input device such as a keyboard and a mouse, and so on.

Next, functional components of the software managing server 30 according to the present embodiment will be described. As shown in FIG. 1, the software managing server 30 of the present embodiment is functionally composed of identification information receiver 31, update software storage 32, difference file creator 33, update file information transmitter 34, reservation information storage (reservation information storing means) 35, reservation candidate generator (reservation candidate generating means) 36, reservation registerer (reservation registering means) 37, available range generator (available range generating means) 38, transfer request receiver (data request receiving means) 39, and update file transmitter (data transmitting means) 40. These components are constructed, for example, as software loaded on the memory of the software managing server 30. The functions of these components are implemented in such a manner that in accordance with the software, the CPU accesses the update software storage 32 constructed on the hard disk or controls the communication device. The functional components of the software managing server 30 will be described below in detail.

The identification information receiver 31 receives through the communication device the aforementioned identification information transmitted by the identification information transmitter 12 of the communication terminal 10. The identification information receiver 31 outputs the received identification information to the difference file creator 33.

The update software storage 32 stores update software of each target communication terminal in correspondence to a terminal ID and version information of software. The update software storage 32 is constructed on the hard disk of the software managing server 30. Specifically, as shown in FIG. 7, the update software storage 32 stores update software to be stored on the rewritable nonvolatile memory of each communication terminal and a file capacity thereof in correspondence to a terminal ID of the communication terminal and version information of the update software.

The difference file creator 33 acquires the identification information outputted by the identification information receiver 31, and creates a difference file between the update software to be stored on the rewritable nonvolatile memory of communication terminal 10, which is stored in the update software storage 32, and the software currently under operation on the rewritable nonvolatile memory of the communication terminal 10, based on the terminal ID included in the identification information and the version information of the software directly executed as stored on the rewritable nonvolatile memory of the communication terminal 10.

For example, supposing the terminal ID of the communication terminal 10 included in the identification information is "0001" and the version number of the software currently under operation on the rewritable nonvolatile memory of the communication terminal 10 is "1," as shown in FIG. 7, the new update software stored in the update software storage 32 is "2" which is the up-to-date version. In this case, the difference file creator 33 creates a difference file of the update software of version "2" from the update software of version "1". The difference file creator 33 outputs the created difference file as an update file to the update file transmitter 40, and outputs to the update file information transmitter 34 update file information containing the information indicating the presence of the update file and the size information of the difference file.

In the present embodiment the difference file creator 33 creates the difference file, but if the band of the communication line of the software managing system is wide enough to transfer a large-size file and if the rewritable volatile memory of the communication terminal has a capacity enough to store the update software without creating the difference file, the update software itself may be outputted directly as an update file to the update file transmitter 40 and the size of the update software may be included as the size information in the update file information to be outputted to the update file transmitter 40. In the above example using this method, the update software of the version "2" is outputted directly as an update file to the update file transmitter 40, and the update file information is made to contain the size information of 150 [bytes] being the size of the update software of the version "2," and outputted to the update file information transmitter 34.

On the other hand, where there is no update software with a version newer than the current version, e.g., in a case where the terminal ID of communication terminal 10 included in the identification information is "0001" and where the version number of the software currently under operation on the rewritable nonvolatile memory of communication terminal 10 is "2," as shown in FIG. 3, the difference file creator 33 outputs the update file information containing the absence of update software, to the update file information transmitter 34. The software managing server 30 may be arranged to preliminarily generate difference files between update software programs corresponding to various version numbers, preliminarily store them in a database, and use these difference files preliminarily stored.

The update file information transmitter 34 transmits the update file information received from the difference file creator 33, through the communication device to the communication terminal 10.

The reservation information storage 35 stores a reservation table in which the reservation for download is to be allocated. This reservation table has reservation frames within a maximum number at each time to permit simultaneous execution of download. The number of reservation frames is set based on a state of loads on the server and on the transmission path at each time preliminarily measured.

Figure 8:
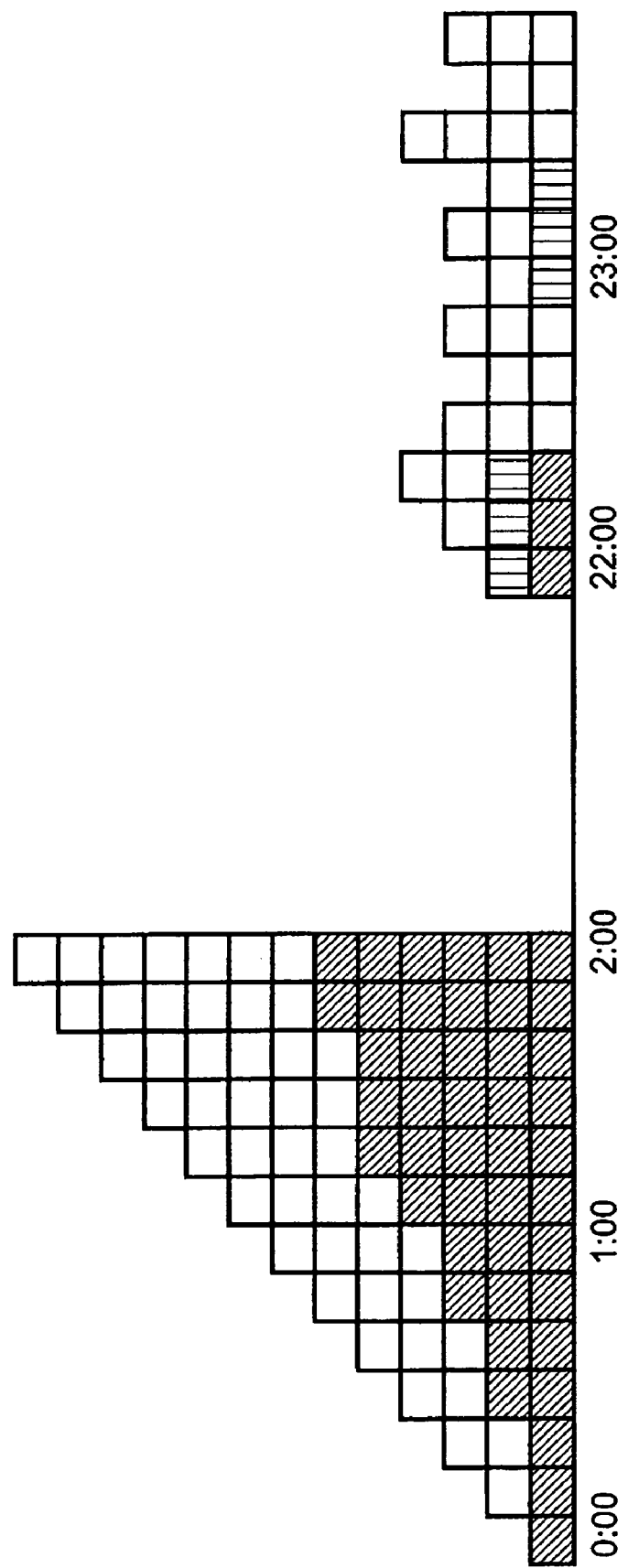
FIG. 8 is an illusion showing contents of a reservation table stored in a reservation information storage of the software managing server according to the embodiment.

FIG. 8 is an illustration showing contents of a day in the reservation table stored in the reservation information storage 35. In FIG. 8, square boxes indicate reservation frames. As shown in FIG. 8, reservation frames to each of which the reservation for download of the update file is allocated are provided at each time in the reservation table stored in the reservation information storage 35. The maximum number of reservation frames is determined based on a state of loads on the server and on the transmission path at each time preliminarily measured, at each of times as described above. Namely, this reservation table is so defined that more reservation frames are provided in off-peak zones with less loads on the server and on the transmission path and that the number of reservation frames is small at times when the loads are heavy on the server and on the transmission path. This spreads the loads of download of the update file. The reservation frames hatched by oblique lines in FIG. 8 indicate frames to which a reservation for download is already allocated.

In response to the transmission request for transmission of the reservation candidate information transmitted from the communication terminal 10 as described above, the reservation candidate generator 36 refers to the reservation table in the reservation information storage 35 to generate the reservation candidate information preferentially containing as candidates the time information about time zones with more remaining reservation frames, out of time zones to which a time necessary for transfer of the update file to be downloaded by the communication terminal 10 can be allocated, and transmits this reservation candidate information to the communication terminal 10.

The reservation candidate generator 36 temporarily allocates in the reservation table a reservation, together with the information to identify the communication terminal 10, to each of time zones corresponding to the time information included in the generated reservation candidate information. In the example shown in FIG. 8, the hatching with vertical lines on the reservation frames indicate that a reservation is temporarily allocated thereto by the reservation candidate generator 36.

Furthermore, when the communication terminal 10 transmits the request for transmission of the reservation candidate information as described above, the reservation candidate generator 36 generates the reservation candidate information containing as candidates the time information about time zones the start time of which is included in the hour specified based on the reservation candidate information and which are available for the reservation for download, and transmits this reservation candidate information to the communication terminal 10.

The reservation registerer 37 actually registers in the reservation table, a reservation in a time zone corresponding to the reservation time information included in the reservation choice information transmitted by the communication terminal 10. Then the reservation registerer 37 cancels the reservations other than the time zone actually registered as described above, among the reservations temporarily allocated for the communication terminal 10 by the reservation candidate generator 36 as described above.

In response to the transmission request for transmission of the available range information transmitted by the communication terminal 10, the available range generator 38 generates the available range information and transmits this available range information to the communication terminal 10. FIG. 9 is an illustration showing a data format of the available range information. As shown in FIG. 9, the available range information generated by the available range generator 38 is generated in the list format of information indicating the presence/absence of a time zone available for a reservation for download of an update file, the start time of which is included in each hour, where one month is a predetermined period and this period is divided into units of one hour. In FIG. 9, "1" indicates the presence of the time zone, and "0" the absence of the time zone. Values of these "1" and "0" can be expressed by binary values. Namely, the information indicating the presence/absence of the aforementioned time zone in each hour can be indicated by one bit.

The transfer request receiver 39 receives through the communication device the request for transfer of the update file transmitted by the transfer request transmitter 18 of the communication terminal 10.

The update file transmitter 40 transmits the update file through the communication device to the communication terminal 10, based on the foregoing request received by the transfer request receiver 39.

Figure 10:
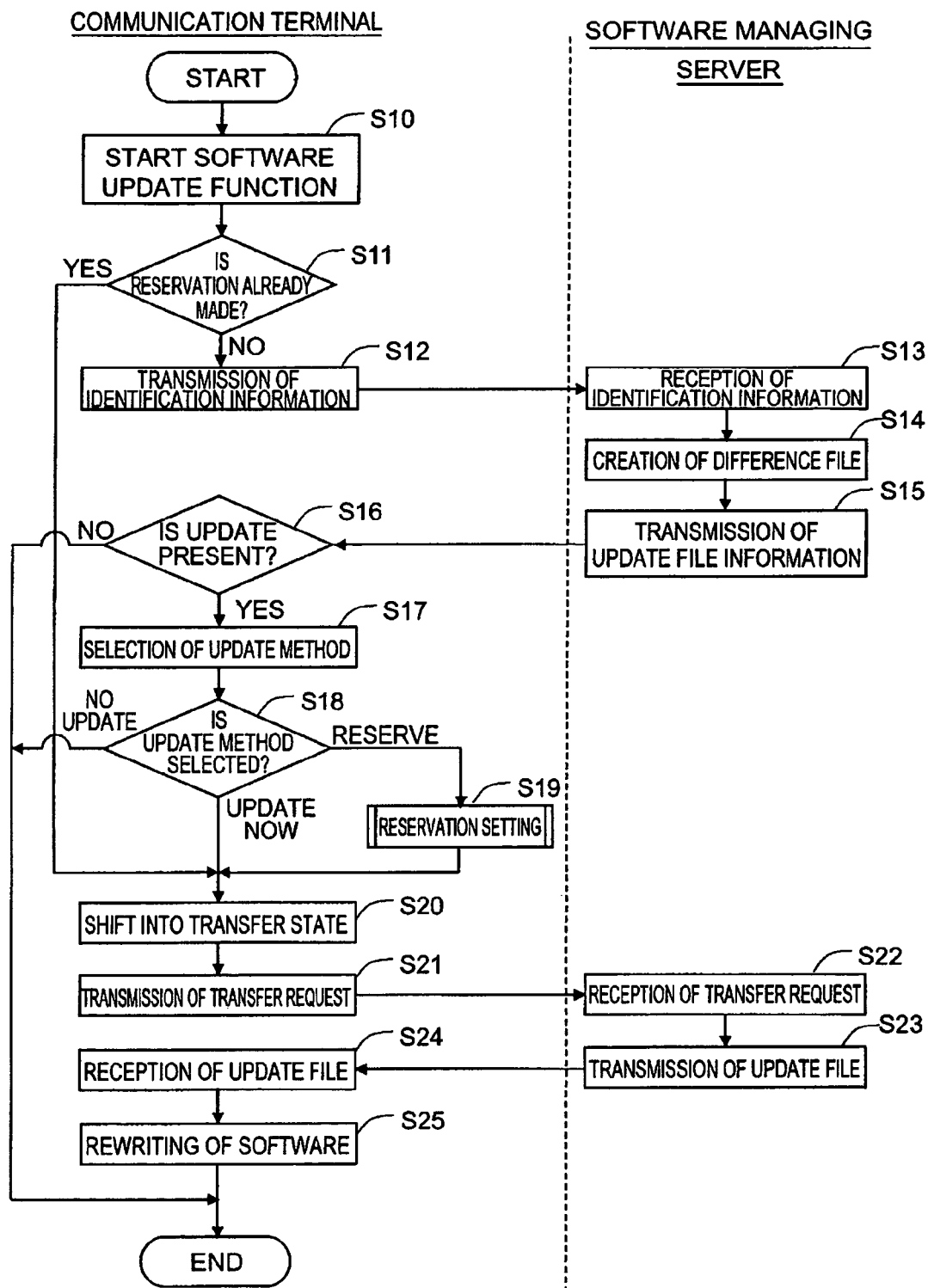
FIG. 10 is an illustration showing a flowchart of a software update method according to an embodiment.
Figure 11:
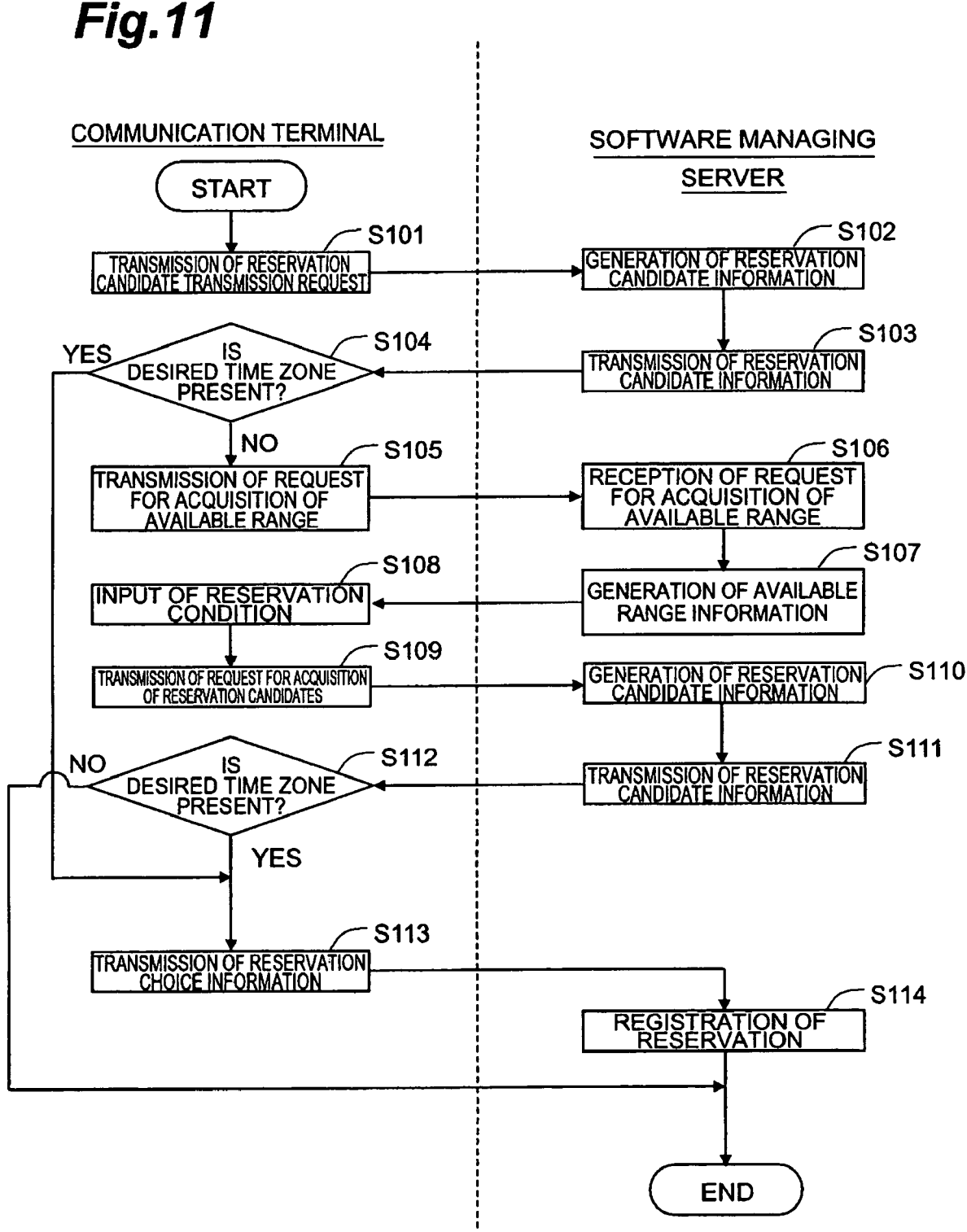
FIG. 11 is an illustration showing a flowchart of a software update method according to the embodiment.

Next the operation of the software update system according to the embodiment of the present invention will be described, together with a method of updating software in the software update system according to the present embodiment. FIGS. 10 and 11 are flowcharts for explaining the software update method according to the present embodiment.

First, the software update function is initiated in the communication terminal 10 (step S10). It is then determined in the communication terminal 10 whether a reservation for download of an update file is already made (step S11). When the result of this determination is that a reservation for download of an update file is already made, the flow shifts to a process at step S20.

On the other hand, when no reservation for download of an update file is made yet, the identification information twitter 12 transmits the identification information to the software managing server 30 (step S12). The identification information receiver 31 of the software managing server 30 receives the identification information transmitted by the identification information transmitter 12 (step S13), and outputs the identification information to the difference file creator 33.

When there is update software to be transferred from the update software storage 32 to the communication terminal 10, based on the terminal ID of the communication terminal 10 and the version information of the software included in the identification information, the difference file creator 33 creates a difference file between the update software and the software directly executed as stored on the rewritable non-volatile memory of the communication terminal 10 (step S14), and outputs it as an update file to the update file transmitter 40. The difference file creator 33 also outputs the update file information containing the information indicating the presence of the update file and the size information of the update file to the update file information transmitter 34.

When there is no update file on the other hand, the difference file creator 33 outputs the update file information indicating the absence of the update file to the update file information transmitter 34. In this embodiment the update file is generated by generating the difference file, but it is also possible to transmit the update software itself directly as an update file.

Next, the update file information transmitter 34 transmits the update file information received from the difference file creator 33, to the communication terminal 10 (step S15). The update file information receiver 13 of the communication terminal 10 receives the update file information transmitted by the update file information transmitter 34 and determines whether there is an update file (step S16). When there is no update file, the communication between communication terminal 10 and software managing server 30 is disrupted and the software update process is terminated.

When there is an, update file on the other hand, the reservation candidate acquirer 14 displays the screen to encourage the user to select one of the aforementioned software update methods (cf FIG. 2) (step S17). When the user selects the "Reserve" for the download of the update file in accordance with this display, a reservation setting process is carried out (step S19).

FIG. 11 is a flowchart showing this reservation setting process. In this reservation setting process, as shown in FIG. 11, the reservation candidate acquirer 14 of communication terminal 10 transmits a transmission request for transmission of the reservation candidate information to the software managing server 30 (step S101).

In response to this transmission request for transmission of the reservation candidate information, the reservation candidate generator 36 of the software managing server 30 generates the aforementioned reservation candidate information (step S102) and transmits this reservation candidate information to the communication terminal 10 (step S103).

The communication terminal 10 displays candidates of time zones indicated by the time information included in the transmitted reservation candidate information (cf. FIG. 3), and the user determines whether they contain a desired time zone (step S104).

When the result of this determination is that the user selects a desired time zone, the reservation selector 15 transmits the reservation choice information containing the reservation time information about the time zone, to the software managing server, and stores the start time of the time zone corresponding to the reservation time information, as a download initiation time of the update file (step S113).

When the result of the above determination is that the user determines that there is no desired time zone and selects the "Specify condition" icon on the screen of the communication terminal 10 as described above, the available range acquirer 16 transmits a request for transmission of the available range information to the software managing server 30 (step S105).

The available range generator 38 of the software managing server 30 receives the request for transmission of the available range information (step S106), generates the available range information as described above, and transmits this available range information to the communication terminal 10 (step S107).

Next, the available range acquirer 16 of the communication terminal 10 receives the available range information transmitted from the software managing server 30. The available range acquirer 16 provides the display of information indicating the presence/absence of a time zone available for the reservation for download of the update file at each time, where the period of one month is sectioned in units of one hour as described above, based on the available range information (cf. FIGS. 4 and 5). When the user selects a time in accordance with this display (step S108), the reservation candidate acquirer 14 transmits a transmission request for transmission of the reservation candidate information accompanied by the condition of the selected time, to the software managing server 30 (step S109).

In response to the request for transmission of the reservation candidate information transmitted from the communication terminal 10, the reservation candidate generator 36 of the software managing server 30 generates the reservation candidate information containing the time information about time zones the start time of which belongs to the time added as the condition to the request and which are available for the reservation for download of the update file (step S110). The reservation candidate generator 36 transmits the generated reservation candidate information to the communication terminal 10 (step S111).

The reservation candidate acquirer 14 of the communication terminal 10 provides the display of candidates of the time zones specified by the time information included in the reservation candidate information transmitted from the software managing server 30, and the user determines whether the candidates include a desired time zone (step S112).

When the user determines that there is no desired time zone, this reservation setting process is terminated. When the user selects a desired time zone on the other hand, the reservation selector 15 transmits to the software managing server the reservation choice information containing the reservation time information about the time zone and stores the start time of the time zone corresponding to the reservation time information, as a download initiation time of the update file (step S113).

In the software managing server 30, the reservation in the time zone corresponding to the reservation time information included in the reservation choice information transmitted by the communication terminal 10 is registered in the reservation table stored in the reservation information storage 35 (step S114).

Returning to step S18 in FIG. 10, when the user selects the "Not update" in accordance with the display of the screen to encourage the user to select one of the software update methods given by the reservation candidate acquirer 14 of the communication terminal 10, the sequential processing associated with the software update is terminated.

On the other hand, in accordance with the aforementioned display the user selects the "Update now" for the software, the point of the time is defined as a start time. When the reservation setting process is selected (step S19), the initiation time stored in the reservation selector 15 is defined as a start time. Then the transfer state shifter 17 limits the operation of software using the rewritable volatile memory of the communication terminal 10, based on the size information included in the update file information, at the start time to secure an area necessary for transfer of the update file (step S20), thereby enabling the transfer of the update file (step S20).

After the transfer state shifter 17 makes a shift into a state in which the transfer of the update file is possible, the transfer request transmitter 18 transmits a request for transmission of the update file to the software managing server 30 (step S21). The transfer request receiver 39 of the software managing server 30 receives the request transmitted by the transfer request transmitter 18 (step S22), and the update file transmitter 40 transmits the update file to the communication terminal 10 on the basis of the request (step S23).

The update file receiver 19 of the communication terminal 10 receives the update file transmitted by the update file transmitter 40 of the software managing server 30 and stores it on the rewritable volatile memory (step S24).

After completion of the storage of the update file on the rewritable volatile memory by the update file receiver 19, the communication between communication terminal 10 and software managing server 30 is disrupted, and the software rewriter 20 rewrites the software stored on the rewritable nonvolatile memory, according to the difference file included in the update file (step S25).

After completion of the update of software by the software rewriter 20, the limitation on the operation is canceled on the rewritable volatile memory limited by the transfer state shifter 17, so as to move into the normal operating state.

The action and effect of the software update system 1 according to the present embodiment will be described below. When the communication terminal 10 makes a reservation for a time zone to download an update file from the software managing server 30, the software managing server 30 transmits the reservation candidate information containing the time information about time zones available for the reservation for the download. The software managing server 30 determines the foregoing time zones, based on the reservation table in which the reservation for the download is allocated to reservation frames within a maximum to permit simultaneous execution of the download at each time so as to spread the loads on the basis of track records of the loads on the software managing server 30 and on the transmission path, and generates the reservation candidate information containing the time information about the time zones. Namely, the software managing server 30 generates the reservation candidate information containing the time information about the time zones to which the time necessary for the download of the update file can be allocated. With the communication terminal 10, the user selects a reserved time zone for the download out of the time zones indicated by the time information included in the reservation candidate information, and transmits the reservation choice information containing the reservation time information about this reserved time zone to the software managing server 30. In the communication terminal 10, the start time of the reserved time zone is stored as an initiation time of the download. The software managing server 30 registers the reservation in the time zone corresponding to the reservation time information included in the reservation choice information. The communication terminal 10 transmits a request for transmission of data to the software managing server 30 at the foregoing initiation time stored, and receives the data transmitted from the software managing server 30. As described above, the software managing server 30 is able to determine the time zones to which reservation frames with no reservation belong, from the reservation table provided with the reservation frames set so as to spread the loads such as the load on the server and the load on the transmission path, to define them as candidate time zones for the download, and to notify the communication terminal 10 of the information about the candidate time zones. Therefore, the user of the communication terminal 10 is permitted to select a desired time zone out of the candidate time zones for the download, whereby the system is more convenient to the user of the communication terminal 10. Since the allocation of the reservation for the download carried out as described above is executed based on the reservation table set so as to spread the load on the software managing server 30 and the load on the transmission path, it is feasible to appropriately spread the loads on the software managing server 30 and on the transmission path.

In generating the reservation candidate information, the software managing server 30 temporarily allocates reservations corresponding to the time information included in the reservation candidate information, in the aforementioned reservation table. Then the software managing server 30 actually registers the reservation in the time zone corresponding to the reservation time information included in the reservation choice information transmitted from the communication terminal 10, and cancels the other reservations. Therefore, where the user of the communication terminal 10 selects a reserved time zone out of the time zones corresponding to the time information included in the reservation candidate information, the software managing server 30 will never allocate the reservation in the time zone to another communication terminal 10, whereby the convenience is much enhanced about the reservation for the download of data.

In generating the reservation candidate information, the software managing server 30 generates the reservation candidate information preferentially containing the time information about time zones with more remaining reservation frames, whereby the loads are further spread on the software managing server 30 and on the transmission path.

When the user of the communication terminal 10 desires to acquire specified candidates of time zones for the reservation for the download of the update file, the communication terminal transmits a request for acquisition of the available range information to the software managing server 30, and the software managing server 30 generates the available range information and transmits it to the communication terminal 10. Here the available range information contains the information about the presence/absence of a time zone available for the reservation for the download of the update file, for example, in each of hours obtained by dividing the period of one month in units of one hour. When the user refers to the screen displayed on the communication terminal 10 on the basis of the available range information and selects an hour to make a reservation for the download, the communication terminal 10 transmits a request for transmission of the reservation candidate information accompanied by the additional condition of the hour selected, to the software managing server 30. The software managing server 30 generates the reservation candidate information containing the time information about time zones whose start time belongs to the hour attached to this reservation candidate information, out of the time zones available for the reservation for the download, and transmits the information to the communication terminal 10. In this manner, the user of the communication terminal 10 is able to preliminarily roughly know the hours available for the download of the update file, based on the available range information transmitted from the software managing server 30. When the request for transmission of the reservation candidate information to specify a desired hour as a condition out of the hours available for the download of the update file, roughly known in this manner, is transmitted to the software managing server 30, the software managing server 30 notifies the user of only candidates of time zones available for the reservation for the download during the period desired by the user, whereby the convenience to the user of the communication terminal 10 is further enhanced about the reservation for the download.

The aforementioned available range information is comprised of a list indicating binary values of the information about the presence/absence of a time zone available for the reservation for the download in each hour resulting from the division of the period of one month in units of one hour. Namely, where there is a time zone available for the reservation for download in each hour, it is indicated by a bit of on; where there is no time zone in reverse, it is indicated by a bit of off. Therefore, the data volume is lower than in generation of the available range information as text information, so that the load can become lighter on the transmission path. It is also possible to further convert the list of binary data generated in this manner, into text data by a text conversion method such as Base 64 and to use the list resulting from the text conversion. The use of the list resulting from the text conversion of binary data enables transmission of the foregoing list even if a network in the software update system 1 adopts a protocol incapable of transmitting binary data.

The present invention can be modified in various ways without being limited to the embodiments described above. For example, in the software update system 1 of the above embodiment, the software managing server 30 makes the reservation candidate information initially transmitted to the communication terminal 10, preferentially contain the time information about time zones with more reservation frames to which no reservation is allocated yet. This is for making the software managing server 30 exercise initiative for preferentially allocating the reservation to off-peak zones with less loads on the server and on the transmission path. Instead of this configuration, the system may be configured as follows. The available range acquirer 16 first transmits the request for transmission of the available range information to the software managing server 30, and the software managing server 30 generates the available range information about all the time zones to which the reservation for the download of the update file can be allocated. Then the communication terminal 10 transmits to the software managing server 30 a request for transmission of the reservation candidate information containing as a condition a desired hour designated based on the available range information by the user of the communication terminal 10, and the software managing server 30 generates the reservation candidate information containing candidate time zones available for the download for the update file, the start time of which belongs to the hour included as the condition in the request for transmission. In this case, the user of the communication terminal 10 is able to make the reservation for the download of the update file in the desired time zone through the initiative by the user of the communication terminal 10, instead of the candidate time zones generated through the initiative by the software managing server 30, and thus the convenience is much enhanced.

In the present embodiment, the aforementioned available range information contained the information indicating only the presence/absence of a time zone available for the reservation for the download in each hour resulting from the division of the period of one month in units of one hour. Instead thereof, the available range information can also be arranged to contain level information indicating a level according to the number of reservation frames without a reservation allocated in each hour. This level information can be expressed, for example, by use of 2-bit information. In this case, the 2-bit information can represent four information items of "sufficient reservation frames," "few reservation frames," "no reservation frame," and "out of hours as reservation-allocated targets." Then the communication terminal 10 provides the display reflecting the differences according to the level information of each hour, based on the available range information, and the user of the communication terminal 10 is able to preliminarily know in which hour the reservation can be readily secured, and thus the convenience is further enhanced.

The present embodiment described the example of application of the present invention to the download of the update file in the software update process, but the present invention can also be applied to download of various data such as content files, without being limited to only the update of software.

INDUSTRIAL APPLICABILITY

The present invention permits the user to select a time zone for execution of download of data out of candidate time zones available for the reservation for the download, generated by the server, and thus the present invention enhances the user's convenience about the download of data by the communication terminal. Since the candidate time zones available for the reservation of download generated by the server are determined based on the reservation table set so as to spread the loads on the server and on the transmission path, it is feasible to appropriately spread the loads on the server and the transmission path.

The invention claimed is:

1. A download system comprising a server to manage data, and a communication terminal to download the data from the server, the communication terminal comprising:

reservation candidate acquiring means for transmitting, to the server, a transmission request for transmission of reservation candidate information containing time information indicating at least a start time corresponding to each of a plurality of candidate time zones, all of which are available for allocation of a reservation for download of the data, and for acquiring the reservation candidate information transmitted in response to the request by the server;

reservation selecting means for transmitting, to the server, reservation choice information containing, as reservation time information, the time information selected, based on the reservation candidate information acquired by the reservation candidate acquiring means, and for storing a start time corresponding with a selected one of the plurality of time zones, indicated by the reservation time information, as an initiation time of the download;

data request transmitting means for transmitting a transmission request for transmission of the data to the server, at the initiation time stored by the reservation selecting means; and data receiving means for receiving the data transmitted by the server in accordance with the transmission request for transmission of the data transmitted by the data request transmitting means; and the server comprising:

data storing means for storing the data;

reservation information storing means for storing a reservation table in which the reservation for the download is to be allocated to reservation frames within a maximum number at each time to permit simultaneous execution of the download, set based on a load state at each time preliminarily measured;

reservation candidate generating means for, in response to the transmission request for the transmission of the reservation candidate information transmitted by the communication terminal, determining the plurality of time zones as candidates available for the download of the data, based on the reservation table stored in the reservation information storing means, for generating the reservation candidate information containing the time information about each of the plurality of time zones, and for transmitting the reservation candidate information to the communication terminal;

reservation registering means for receiving the reservation choice information transmitted by the communication terminal, and for registering in the reservation table the reservation for the download at one of the time zones corresponding to the reservation time information included in the reservation choice information; and data transmitting means for transmitting to the communication terminal the data stored in the data storing means, in response to the transmission request for transmission of the data transmitted by the communication terminal.

2. The download system according to claim 1, wherein, in generating the reservation candidate information, the reservation candidate generating means of the server temporarily allocates in the reservation table, reservations for the download corresponding to the time information included in the reservation candidate information, together with information to identify the communication terminal having transmitted the transmission request for transmission of the reservation candidate information, and wherein the reservation registering means adopts the reservation in the time zone corresponding to the reservation time information included in the reservation choice information transmitted by the communication terminal, among the reservations temporarily allocated together with the information to identify the communication terminal, in the reservation table, and cancels the other reservations temporarily allocated together with the information to identify the communication terminal, in the reservation table.

3. The download system according to claim 1, wherein, in generating the reservation candidate information, the reservation candidate generating means of the server generates the reservation candidate information preferentially including the time information about the plurality of time zones with a large number of said reservation frames to which the reservation for the download is not allocated, based on the reservation table.

4. The download system according to claim 1, wherein the communication terminal further comprises available range acquiring means for transmitting to the server a transmission request for transmission of available range information containing information about presence/absence of a time zone available for the reservation for the download in each of second predetermined periods obtained by subdividing a first predetermined period, and for receiving the available range information transmitted from the server, wherein the server further comprises available range generating means for generating the available range information in accordance with the transmission request for transmission of the available range information transmitted by the communication terminal, and for transmitting the available range information to the communication terminal, wherein the reservation candidate acquiring means transmits to the server the transmission request for transmission of the reservation candidate information containing the information about the second predetermined period selected based on the available range information received by the available range acquiring means, and wherein the reservation candidate generating means generates the reservation candidate information containing the time information about the plurality of time zones available for the reservation for the download in the second predetermined period, based on the information about the second predetermined period included in the transmission request for transmission of the reservation candidate information transmitted by the communication terminal, and transmits the reservation candidate information to the communication terminal.

5. The download system according to claim 4, wherein the available range information generated by the available range generating means contains level information indicating a number of said reservation frames to which the reservation for the download is not allocated, in each of the second predetermined periods.

6. The download system according to claim 4, wherein the available range information generated by the available range generating means is comprised of a list indicating binary values of the information about the presence/absence of a time zone available for the reservation for the download in each of the second predetermined periods.

7. The download system according to claim 4, wherein the available range information generated by the available range generating means is comprised of a list resulting from further text conversion of a list indicating binary values of the information about the presence/absence of a time zone available for the reservation for the download in each of the second predetermined periods.

8. A communication terminal adapted for downloading data from a server to manage the data, comprising:

reservation candidate acquiring means for transmitting to the server a transmission request for transmission of reservation candidate information containing time information indicating at least a start time corresponding to each of a plurality of candidate time zones, all of which are available for allocation of a reservation for download of the data, and for acquiring the reservation candidate information transmitted in response to the request by the server;

reservation selecting means for transmitting, to the server, reservation choice information containing, as reservation time information, the time information selected based on the reservation candidate information acquired by the reservation candidate acquiring means, and storing means for storing a start time corresponding with a selected one of the plurality of time zones, indicated by the reservation time information, as an initiation time of the download;

data request transmitting means for transmitting a transmission request for transmission of the data to the server, at the initiation time stored by the reservation selecting means; and data receiving means for receiving the data transmitted by the server in accordance with the transmission request for transmission of the data transmitted by the data request transmitting means.

9. The communication terminal according to claim 8, further comprising available range acquiring means for transmitting to the server a transmission request for transmission of available rage information containing information about presence/absence of a time zone available for the reservation for the download in each of second predetermined periods obtained by subdividing a first predetermined period, and for receiving the available range information transmitted from the server, wherein the reservation candidate acquiring means transmits to the server the transmissions request for transmission of the reservation candidate information containing the information about the second predetermined period selected based on the available range information received by the available range acquiring means.

10. A server adapted for managing data to be downloaded by a communication terminal, comprising:

data storing means for storing the data;

reservation information storing means for storing a reservation table in which the reservation for the download is to be allocated to reservation flames within a maximum number at each time to permit simultaneous execution of the download, set based on a load state at each time preliminarily measured;

reservation candidate generating means for, in response to the transmission request for the transmission of the reservation candidate information transmitted by the communication terminal, determining time zones as candidates, all of which are available for the download of the data, based on the reservation table stored in the reservation information storing means, for generating the reservation candidate information containing time information about each of the time zones, indicating at least a start time thereof, and for transmitting the reservation candidate information to the communication terminal;

reservation registering means for receiving the reservation choice information containing as reservation time information the time information selected based on the reservation candidate information, transmitted by the communication terminal, and for registering in the reservation table the reservation for the download at one of the time zones, indicated by the reservation time information included in the reservation choice information; and data transmitting means for transmitting to the communication terminal the data stored in the data storing means, in response to the transmission request for transmission of the data transmitted at the start time of the reservation time information by the communication terminal.

11. The server according to claim 10, wherein, in generating the reservation candidate information, the reservation candidate generating means temporarily allocates in the reservation table, reservations for the download corresponding to the time information included in the reservation candidate information, together with information to identify the communication terminal having transmitted the transmission request for transmission of the reservation candidate information, and wherein the reservation registering means adopts the reservation in the time zone corresponding to the reservation time information included in the reservation choice information transmitted by the communication terminal, among the reservations temporarily allocated together with the information to identify the communication terminal, in the reservation table, and cancels the other reservations temporarily allocated together with the information to identify the communication terminal, in the reservation table.

12. The server-according to claim 10, wherein, in generating the reservation candidate information, the reservation candidate generating means generates the reservation candidate information preferentially contain the time information about the plurality of time zones with a large number of said reservation frames to which the reservation for the download is not allocated, based on the reservation table.

13. The server according to claim 10, further comprising available range generating means for receiving a transmission request for transmission of available range information transmitted by the communication terminal, for, in response to the transmission request for transmission of the available range information, generating the available range information containing information about presence/absence of a time zone available for the reservation for the download in each of second predetermined periods obtained by subdividing a first predetermined period, and for transmitting the available range information to the communication terminal, wherein the reservation candidate generating means receives the reservation candidate information containing information about the second predetermined period selected based on the available range information, transmitted by the communication terminal, generates the reservation candidate information containing the time information about the plurality of time zones available for the reservation for the download in the second predetermined period, based on the information about the second predetermined period included in the transmission request for transmission of the reservation candidate information, and transmits the reservation candidate information to the communication terminal.

14. The server according to claim 13, wherein the available range information generated by the available range generating means contains level information indicating a number of said reservation frames to which the reservation for the download is not allocated, in each of the second predetermined periods.

15. The server according to claim 13, wherein the available range information generated by the available range generating means is comprised of a list indicating binary values of the information about the presence/absence of a time zone available for the reservation for the download in each of the second predetermined periods.

16. The server according to claim 13, wherein the available range information generated by the available range generating means is comprised of a list resulting from further text conversion of a list indicating binary values of the information about the presence/absence of a time zone available for the reservation for the download in each of the second predetermined periods.

17. A download method in which a communication terminal downloads data from a server to manage the data, the download method comprising:

requesting a reservation candidate, reservation candidate acquiring means of the communication terminal transmitting to the server a transmission request for transmission of reservation candidate information containing time information indicating at least a start time corresponding to each of a plurality of candidate time zones, each of which is available for allocation of a reservation for download of the data;

generating a reservation candidate in response to the request for transmission of the reservation candidate information transmitted by the communication terminal, reservation candidate generating means of the server determining the plurality of time zones as candidates available for the download of the data, based on a reservation table in which the reservation for the download is to be allocated to reservation frames within a maximum number at each time to permit simultaneous execution of the download, set based on a load state at each time preliminarily measured, and which is stored in reservation information storing means, generating the reservation candidate information containing the time information about the plurality of time zones, and transmitting the reservation candidate information to the communication terminal;

acquiring a reservation candidate, reservation candidate acquiring means of the communication terminal acquiring the reservation candidate information transmitted by the server, selecting a reservation, reservation selecting means of the communication terminal transmitting to the server reservation choice information containing as reservation time information the time information selected based on the reservation candidate information acquired by the reservation candidate acquiring means, and storing a start time corresponding with a selected one of the plurality of time zones indicated by the reservation time information, as an initiation time of the download;

registering a reservation, registering means of the server receiving the reservation choice information transmitted by the communication terminal, and registering in the reservation table the reservation for the download in the selected one of the plurality of time zones corresponding to the reservation time information included in the reservation choice information;

transmitting a data request, data request transmitting means of the communication terminal transmitting a transmission request for transmission of the data to the server, at the initiation tune stored by the reservation selecting means;

transmitting data, data transmitting means of the server transmitting to the communication terminal the data stored in the data storing means, in response to the transmission request for transmission of the data transmitted by the communication terminal; and receiving data, data receiving means of the communication terminal receiving the data transmitted by the server in accordance with the transmission request for transmission of the data.

18. The download method according to claim 17, wherein generating the reservation candidate information includes temporarily allocating in the reservation table, reservations for the download corresponding to the time information included in the reservation candidate information, together with information to identify the communication terminal having transmitted the transmission request for transmission of the reservation candidate information, and wherein the reservation registering means of the server adopts the reservation in the selected one of the plurality of time zones corresponding to the reservation time information included in the reservation choice information transmitted by the communication terminal, among the reservations temporarily allocated together with the information to identify the communication terminal, in the reservation table, and cancels the other reservations temporarily allocated together with the information to identify the communication terminal, in the reservation table.

19. The download method according to claim 17, wherein the reservation candidate generating means of the server, in generating the reservation candidate information, generates the reservation candidate information preferentially including the time information about the plurality of time zones with a large number of said reservation frames to which the reservation for the download is not allocated, based on the reservation table.

20. The download method according to claim 17, further comprising:

transmitting an available range request, available range acquiring means of the communication terminal transmitting to the server a transmission request for transmission of available range information containing information about presence/absence of a time zone available for the reservation for the download in each of second predetermined periods obtained by subdividing a first predetermined period;

generating an available range, available range generating means of the server generating the available range information in accordance with the transmission request for transmission of the available range information transmitted by the communication terminal, and transmitting the available range information to the communication terminal; and acquiring an available range, the available range acquiring means of the communication terminal receiving the available range information transmitted from the server, wherein the reservation candidate acquiring means of the communication terminal transmits to the server the transmission request for transmission of the reservation candidate information containing the information about the second predetermined period selected based on the available range information received by the available range acquiring means, and wherein the reservation candidate generating means of the server generates the reservation candidate information containing the time information about the plurality of time zones available for the reservation for the download in the second predetermined period, based on the information about the second predetermined period included in the transmission request for transmission of the reservation candidate information transmitted by the communication terminal, and transmits the reservation candidate information to the communication terminal.

21. The download method according to claim 20, wherein the available range information generated by the available range generating means of the server contains level information indicating a number of said reservation frames to which the reservation for the download is not allocated, in each of the second predetermined periods.

22. The download method according to claim 20, wherein the available range information generated by the available range generating means of the server is comprised of a list indicating binary values of the information about the presence/absence of a time zone available for the reservation for the download in each of the second predetermined periods.

23. The download method according to claim 20, wherein the available range information generated by the available range generating means of the server is comprised of a list resulting from further text conversion of a list indicating binary values of the information about the presence/absence of a time zone available for the reservation for the download in each of the second predetermined periods.

* * * * *